United States Patent
Choi et al.

(10) Patent No.: US 10,291,422 B2
(45) Date of Patent: May 14, 2019

(54) APPARATUS OF SYNCHRONIZATION FOR DOCSIS UPSTREAM SIGNAL TRANSMISSION THROUGH OPTICAL IP NETWORK AND METHOD OF THE SAME

(71) Applicant: ELECTRONICS AND TELECOMMUNICATIONS RESEARCH INSTITUTE, Daejeon (KR)

(72) Inventors: Dong-Joon Choi, Daejeon (KR); Joon-Young Jung, Daejeon (KR); Nam-Ho Hur, Sejong-si (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 15/793,650

(22) Filed: Oct. 25, 2017

(65) Prior Publication Data

US 2018/0145843 A1 May 24, 2018

(30) Foreign Application Priority Data

Nov. 24, 2016 (KR) .................. 10-2016-0157243
Sep. 1, 2017 (KR) .................. 10-2017-0111709

(51) Int. Cl.
*H04J 3/06* (2006.01)
*H04M 7/12* (2006.01)
(Continued)

(52) U.S. Cl.
CPC ...... *H04L 12/2801* (2013.01); *H04L 65/1066* (2013.01); *H04L 65/4076* (2013.01);
(Continued)

(58) Field of Classification Search
None
See application file for complete search history.

(56) References Cited

U.S. PATENT DOCUMENTS 7,848,365 B2 12/2010 Jung et al.
9,225,570 B2 12/2015 Doo et al.
(Continued)

FOREIGN PATENT DOCUMENTS

KR  10-1430145 B1  9/2014
KR  10-1502146 B1  3/2015

OTHER PUBLICATIONS

J.T. Chapman, et al., "The DOCSIS Timing Protocol (DTP) Generating Precision Timing Services from a DOCSIS System," *Proceedings from NCTA Technical Forum*, 2011 (36 pages, in English).

Primary Examiner — James R Marandi
(74) Attorney, Agent, or Firm — NSIP Law

(57) ABSTRACT

Disclosed herein is a synchronization method for transmitting a DOCSIS upstream signal, which is performed by an RoIP terminal, the synchronization method including receiving a synchronization (SYNC) message periodically sent by a Cable Modem Termination System (CMTS) and thereby synchronizing a clock and generating a reference time; receiving a ranging request signal from a Cable Modem (CM); including information about a start time of an allocated ranging interval in the ranging request signal, converting the ranging request signal into an IP packet, and transmitting the IP packet to an RoIP headend device over an IP network in order to enable the RoIP headend device to convert the ranging request signal, delivered via the IP network, into an RF signal and transmit the RF signal to the CMTS; and converting a ranging response message delivered from the CMTS into an electric signal and transmitting the electric signal to the CM.

20 Claims, 13 Drawing Sheets

(51) Int. Cl.
*H04L 12/28* (2006.01)
*H04L 12/70* (2013.01)
*H04L 29/06* (2006.01)
*H04N 21/61* (2011.01)
*H04N 21/242* (2011.01)

(52) U.S. Cl.
CPC ........... H04M 7/125 (2013.01); *H04J 3/0655* (2013.01); *H04L 2012/5615* (2013.01); *H04N 21/242* (2013.01); *H04N 21/6168* (2013.01)

(56) References Cited

U.S. PATENT DOCUMENTS

| | | | |
|---|---|---|---|
| 2003/0048801 A1* | 3/2003 | Sala | H04B 10/272 370/445 |
| 2009/0125959 A1* | 5/2009 | Oh | H04N 21/4383 725/111 |
| 2012/0300859 A1* | 11/2012 | Chapman | H04J 3/0667 375/257 |
| 2016/0241417 A1 | 8/2016 | Park et al. | |
| 2017/0244445 A1* | 8/2017 | Jin | H04B 3/23 |

* cited by examiner

APPARATUS OF SYNCHRONIZATION FOR DOCSIS UPSTREAM SIGNAL TRANSMISSION THROUGH OPTICAL IP NETWORK AND METHOD OF THE SAME

CROSS REFERENCE TO RELATED APPLICATIONS

This application claims the benefit of Korean Patent Application No. 10-2016-0157243, filed Nov. 24, 2016, and No. 10-2017-0111709, filed Sep. 1, 2017, which are hereby incorporated by reference in their entirety into this application.

BACKGROUND OF THE INVENTION

1. Technical Field

The present invention relates to technology for enabling a cable modem (CM) to transmit an upstream signal synchronized with a cable network over an optical Internet Protocol (IP) network using signals transmitted and received between the CM and a Cable Modem Termination System (CMTS).

2. Description of the Related Art

A cable broadcast network provides services, such as a digital broadcast service, the Internet service, and the like, using a Hybrid Fiber and Coaxial (HFC) network. The HFC network is configured with a combination of optical fiber and coaxial cable. In the case of a conventional HFC network, a coaxial cable line is about 1 km long. However, recently, in order to accommodate interactive and smart services, the architecture is developed such that optical fiber is extended so as to be closer to subscribers (Deep Fiber) or so as to reach all the way to subscribers (Fiber To The Home (FTTH)).

Multi-System Operators (MSOs) continuously attempt to introduce fiber-optic services in new service areas. In order to provide a cable broadcast service based on an optical network, RF/PON, through which a broadcast is transmitted in the form of Radio Frequency-Overlay (RF-Overlay) and in which two-way signaling and data services for the broadcast are provided using Internet-Protocol (IP) packets over a Passive Optical Network (PON), has been attempted. However, RF/PON faces obstacles to commercialization because it is expensive to replace existing cable infrastructure, such as Set-Top Boxes (STBs) and the like. As an alternative, RF over Glass (RFoG), through which a downstream signal is delivered in the form of RF-Overlay to an STP via optical fiber and an upstream RF signal from the STP is delivered through optical transmission, has also been attempted, but RFoG is not widely used due to implementation costs, such as that of an electro-photic conversion device and the like.

As a solution to the cost-related problems, such as electro-photic conversion device costs and costs for replacing existing infrastructure, a method in which an analog RF signal transmitted from a subscriber's terminal, such as an STB or the like, is digitized and is transmitted over an optical IP network, such as Ethernet PON (EPON), Gigabit PON (GPON), or the like, and in which the upstream signal, transmitted from the STB over the IP network, is converted into an analog RF signal at the headend and is then transmitted to a Cable Modem Termination System (CMTS), has been proposed. However, when an upstream signal is transmitted as described above, because multiple Cable Modems (CMs) on the subscriber's side share a single physical medium, the CMs must transmit their data according to a synchronous time-division multiplexing method, that is, the CMs must transmit data during time slots allocated thereto by the CMTS. Therefore, the present invention intends to provide a method for synchronizing upstream data based on the Data Over Cable Service Interface Specification (DOCSIS) with an existing cable broadcast network and transmitting the same over an optical IP network.

The above-described information about the related art has been retained by the inventors for the purpose of developing the present invention or was obtained during the process of developing the present invention. Also, it should be appreciated that this information did not necessarily belong to the public domain before the patent filing date of the present invention.

DOCUMENTS OF RELATED ART (Patent Document 1) Korean Patent No. 10-1502146.

SUMMARY OF THE INVENTION

An object of the present invention is to provide an apparatus and method for synchronizing a DOCSIS-based upstream signal used in a cable broadcast with a DOCSIS network and transmitting the same over an optical IP network.

An embodiment of the present invention provides a synchronization method for transmitting a DOCSIS upstream signal, which is performed by a Radio over Internet Protocol (RoIP) terminal, the synchronization method including receiving a synchronization (SYNC) message periodically sent from a Cable Modem Termination System (CMTS), and thereby synchronizing a clock and generating a reference time; receiving a ranging request signal from a Cable Modem (CM); including information about a start time of an allocated ranging interval in the ranging request signal, converting the ranging request signal into an IP packet, and transmitting the IP packet to an RoIP headend device over an IP network in order to enable the RoIP headend device to convert the ranging request signal, delivered via the IP network, into an RF signal and to transmit the RF signal to the CMTS; and converting a ranging response message delivered from the CMTS into an electric signal and transmitting the electric signal to the CM.

Here, the synchronization method may further include synchronizing time with the CM using the ranging request signal.

Here, synchronizing time with the CM may be configured to synchronize time using a difference between a time at which the ranging request signal is received and the start time of the allocated ranging interval.

Here, transmitting the electric signal to the CM may include adjusting time by interpreting the ranging response message.

Here, transmitting the IP packet to the RoIP headend device may be configured to convert both the information about the start time of the allocated ranging interval and the ranging request signal into the IP packet and to transmit the IP packet to the RoIP headend device over the IP network in order to enable the RoIP headend device to convert the ranging request signal, delivered via the IP network, into an RF signal and to transmit the RF signal to the CMTS in a last transmission opportunity when the ranging request signal is an initial ranging request signal.

Here, the last transmission opportunity may correspond to a transmission time that makes an end time of the ranging request signal at the CMTS match an end time of the allocated ranging interval when the RoIP headend device transmits the ranging request signal to the CMTS.

Here, transmitting the IP packet to the RoIP headend device may be configured to set, in the packet, a time at which the RoIP headend device is to transmit the ranging request signal to the CMTS to a time at which the ranging request signal is received when the ranging request signal is not an initial ranging request signal.

Another embodiment of the present invention provides a synchronization apparatus for transmitting a DOCSIS upstream signal, which includes a communication unit for communicating with a Cable Modem Termination System (CMTS), an RoIP headend device, and a Cable Modem (CM); a synchronization unit for synchronizing a clock and generating a reference time by receiving a synchronization (SYNC) message periodically sent from the CMTS; and a signal conversion unit for including information about a start time of an allocated ranging interval in a ranging request signal that is delivered from the CM and converting the ranging request signal into an IP packet in order to transmit the ranging request signal to the RoIP headend device and for converting a ranging response message delivered from the CMTS into an electric signal in order to send the ranging response message to the CM.

Here, the synchronization unit may synchronize time using a difference between a time at which the ranging request signal is received from the CM and the start time of the allocated ranging interval.

Here, the synchronization unit may adjust time by interpreting the ranging response message sent from the CMTS.

Here, the signal conversion unit may convert both the information about the start time of the allocated ranging interval and the ranging request signal into the IP packet when the ranging request signal is an initial ranging request signal, and the communication unit may transmit the IP packet to the RoIP headend device over the IP network in order to enable the RoIP headend device to convert the ranging request signal, delivered via the IP network, into an RF signal and to transmit the RF signal to the CMTS in a last transmission opportunity when the ranging request signal is the initial ranging request signal.

Here, the last transmission opportunity may correspond to a transmission time that makes an end time of the ranging request signal at the CMTS match an end time of the allocated ranging interval when the RoIP headend device transmits the ranging request signal to the CMTS.

Here, the signal conversion unit may set a time at which the RoIP headend device is to transmit the ranging request signal to the CMTS to a time at which the ranging request signal is received in the ranging request signal and convert the ranging request signal into the IP packet when the ranging request signal is not an initial ranging request signal, and the communication unit may transmit the IP packet to the RoIP headend device over the IP network in order to enable the RoIP headend device to convert the ranging request signal, delivered via the IP network, into an RF signal and to transmit the RF signal to the CMTS at the set time at which the ranging request signal is to be transmitted when the ranging request signal is not the initial ranging request signal.

A further embodiment of the present invention provides a synchronization method for transmitting a DOCSIS upstream signal, which is performed by an RoIP headend device, the synchronization method including receiving a synchronization (SYNC) message periodically sent from a Cable Modem Termination System (CMTS) and thereby synchronizing a clock and generating a reference time; receiving a ranging request signal, including information about a start time of an allocated ranging interval, from an RoIP terminal over an IP network, the ranging request signal being transmitted from a Cable Modem (CM); converting the ranging request signal into an RF signal; and transmitting the RF signal to the CMTS.

Here, the synchronization method may further include synchronizing time with the CMTS through ranging.

Here, receiving the ranging request signal may be configured to receive the ranging request signal from the RoIP terminal, a time of which is synchronized with the CM using the ranging request signal.

Here, receiving the ranging request signal may be configured to receive the ranging request signal from the RoIP terminal, the time of which is synchronized with the CM using a difference between a time at which the ranging request signal is received and the start time of the allocated ranging interval.

Here, transmitting the RF signal to the CMTS may be configured to transmit the ranging request signal that is converted into the RF signal to the CMTS in a last transmission opportunity using the allocated ranging interval included in the ranging request signal when the ranging request signal is an initial ranging request signal.

Here, the last transmission opportunity may correspond to a transmission time that makes an end time of the ranging request signal at the CMTS match an end time of the allocated ranging interval when the ranging request signal is transmitted to the CMTS.

Here, transmitting the RF signal to the CMTS may be configured to transmit the ranging request signal that is converted into the RF signal to the CMTS at a transmission time set in the ranging request signal by the RoIP terminal when the ranging request signal is not an initial ranging request signal, and the transmission time set in the ranging request signal may be a time at which the RoIP terminal receives the ranging request signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
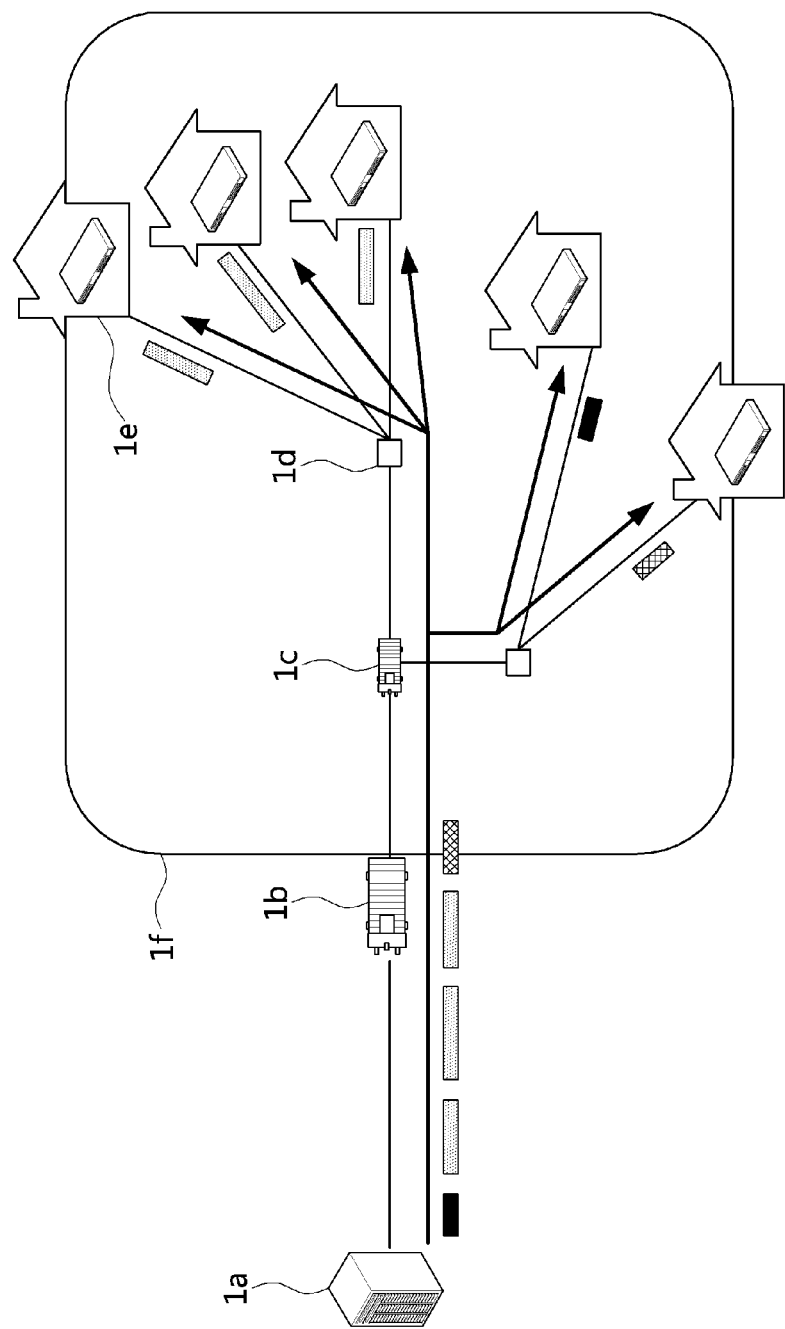
FIG. 1 is a view that shows a structure in which data are transmitted based on DOCSIS in a cable broadcast network according to an embodiment of the present invention.

The present invention may be variously changed, and may have various embodiments, and specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

However, the present invention is not limited to the embodiments to be described below, but all or some of the embodiments may be selectively combined and configured, so that the embodiments may be modified in various ways. It will be understood that, although the terms "first," "second," etc. may be used herein to describe various elements, these elements are not intended to be limited by these terms. These terms are only used to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that shows a structure in which data are transmitted based on DOCSIS in a cable broadcast network according to an embodiment of the present invention.

The Data Over Cable System Interface Specification (DOCSIS) is a standard for transmitting data over an HFC network between a Cable Modem Termination System (CMTS) at the headend and a cable modem (CM) of a subscriber.

Referring to FIG. 1, in the downstream direction, CMs receive all signals transmitted by a CMTS using a Time-Division-Multiplexing (TDM) method, but process only signals delivered to their own addresses by searching the addresses of packets, and deliver the corresponding signals to a Customer-Provided Equipment (CPE), a PC, and the like.

Here, the signal transmitted by the CMTS $1a$ is delivered to an amplifier (AMP) $1c$ after the optical signal is converted into an electric signal in an Optical Network Unit (ONU) $1b$. Then, the signal amplified by the AMP $1c$ is delivered to respective CMs $1e$ via a tap-off $1d$.

Here, the ONU $1b$, the tap-off $1d$, and the CMs $1e$ may constitute a single cell $1f$, and each cell may be formed so as to include CMs within a certain distance from the ONU. For example, a cell may be formed so as to include CMs within one mile from the ONU.

In the upstream direction, according to Time Division Multiple Access (TDMA), CMs transmit their upstream data depending on scheduling information transmitted by the CMTS.

Figure 2:
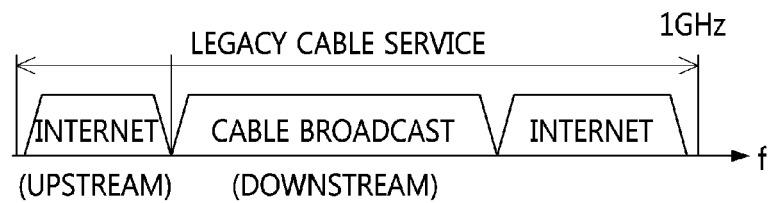
FIG. 2 is a view that shows a frequency range used in a cable broadcast network according to an embodiment of the present invention.

FIG. 2 is a view that shows a frequency range used in a cable broadcast network according to an embodiment of the present invention.

Referring to FIG. 2, in the cable broadcast network, a frequency range for the Internet and a frequency range for a cable broadcast service are separate. Also, an Internet frequency range for upstream transmission and an Internet frequency range for downstream transmission are separate.

Here, frequencies may be divided into the Internet frequency range for upstream transmission, the cable broadcast service frequency range, and the Internet frequency range for downstream transmission in order from the lowest to the highest frequency range.

Figure 3:
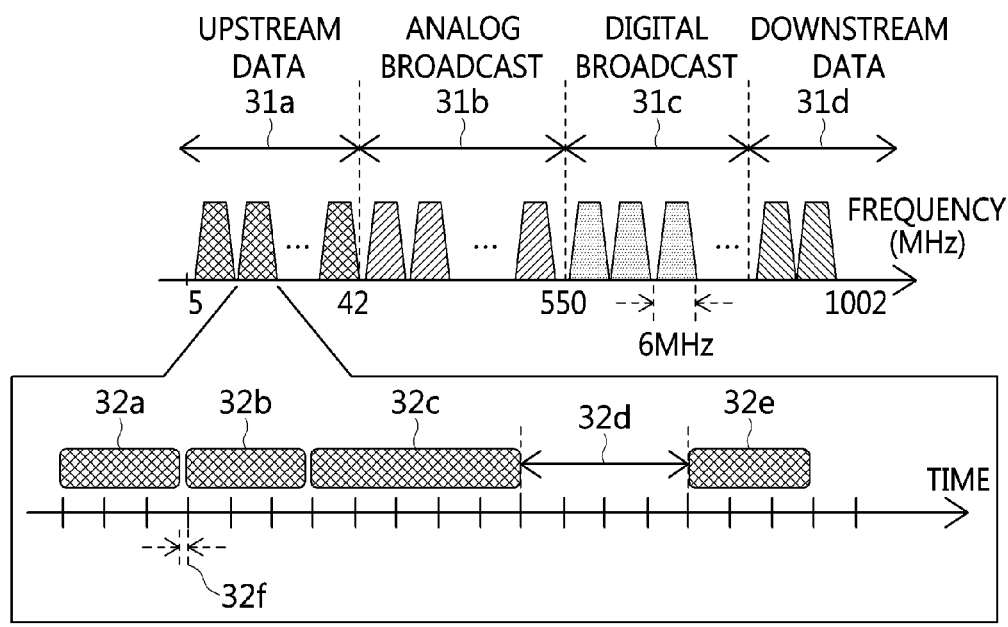
FIG. 3 is a view that shows a structure for upstream data transmission according to an embodiment of the present invention.

FIG. 3 is a view that shows a structure for upstream data transmission according to an embodiment of the present invention.

Referring to FIG. 3, in a cable network according to an embodiment of the present invention, channels for upstream data $31a$, an analog broadcast $31b$, a digital broadcast $31c$, and downstream data $31d$ have respective unique frequency ranges.

Here, respective pieces of upstream data $31a$ share the corresponding upstream band using a time-sharing system.

Here, each cable modem (CM) may synchronize its clock with the CMTS using a synchronization (SYNC) message periodically sent by the CMTS.

That is, all of the CMs using the same upstream channel synchronize their clocks with a timestamp transmitted by the CMTS, and each of the CMs may transmit upstream data (a burst) during a time interval allocated thereto using a Mobile Application Part (MAP) message sent from the CMTS.

For example, the interval $32a$ may be allocated to the CM of terminal 1, the interval $32b$ may be allocated to the CM of terminal 2, the interval $32c$ may be allocated to the CM of terminal 3, and the interval $32e$ may be allocated to the CM of terminal 1. Here, interval $32d$ may be a band request interval.

Here, the MAP message is a control message used when a CM makes a request for transmission from a CMTS or when a CM is allocated a time slot for using a channel by the CMTS in the DOCSIS.

Here, the SYNC message includes a 32-bit counter value generated in the CMTS depending on the 10.24 MHz reference clock, and may be sent to CMs at regular intervals (about every 10 msec. to 200 msec.).

The CM generates an internal clock synchronized with the 10.24 MHz reference clock of the CMTS using the SYNC message, and may internally generate a 32-bit counter value using the synchronized clock.

Here, the 32-bit counter value generated in the CMTS and the 32-bit counter value reconstructed in the CM may be used as time information for band allocation between the CMTS and the CM.

Here, the CMTS allocates different time intervals to the CMs in order to prevent signals transmitted from the CMs from colliding on the same upstream channel, and a guard interval 32f for avoiding a collision may be set between adjacent time intervals.

Here, the guard interval for collision avoidance between adjacent time intervals or a collision avoidance time 32f between bursts may be set equal to or shorter than 1 μs.

Figure 4:
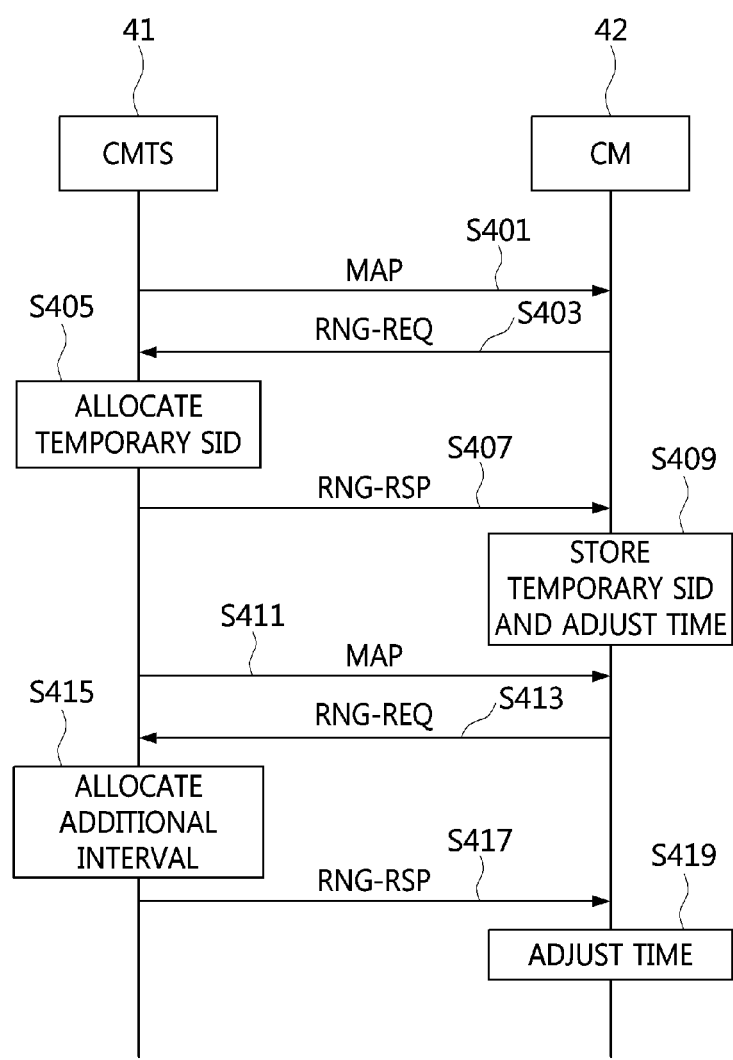
FIG. 4 is a view that shows an initial ranging procedure based on DOCSIS between a Cable Modem Termination System (CMTS) and a cable modem (CM) according to an embodiment of the present invention.

FIG. 4 is a view that shows an initial ranging procedure based on DOCSIS between a cable modem termination system and a cable modem according to an embodiment of the present invention.

The Cable Modem Termination System (CMTS) 41 and the cable modem (CM) 42 have different 32-bit counter values (time information) due to the transmission delay of a SYNC message. Accordingly, initial ranging is performed in order to synchronize different time information.

Referring to FIG. 4, in order to enable the CM 42 to transmit an initial ranging signal before synchronization, the CMTS 41 according to an embodiment of the present invention allocates a broadcast ranging interval and sends a MAP message containing information thereabout to the CM 42 at step S401.

Here, the Service Identifier (SID) for the broadcast ranging interval may be set to 0x3FFF, and the Interval Usage Code (IUC) may be set to 3 in the MAP.

Here, the broadcast ranging interval may be set long enough to accommodate a time difference caused by the transmission delay.

Also, at step S403, the CM 42 according to an embodiment of the present invention sends an initial ranging request (RNG-REQ) message to the CMTS 41 during the initial ranging interval, among allocated intervals transmitted through the MAP, using the internally generated time information.

Here, the SID of the RNG-REQ message may be set to 0.

Also, the CMTS 41 according to an embodiment of the present invention allocates a temporary SID that can be used by the CM 42 thereto and allocates a unicast ranging interval during which only the corresponding CM 42 is permitted to use the upstream band at step S405 in order to enable the CM 42 to send an additional ranging message.

Also, the CMTS 41 according to an embodiment of the present invention sets time adjustment information for the CM 42 in a ranging response (RNG-RSP) message with reference to the time at which the initial RNG-REQ message is received, and then sends the RNG-RSP message at step S407.

Also, the CM 42 according to an embodiment of the present invention receives the RNG-RSP message, stores the temporary SID, and adjusts time information at step S409.

Also, the CMTS 41 according to an embodiment of the present invention transmits a MAP to the CM 42 at step S411.

Here, in the MAP, the SID for the unicast ranging interval has the value set in the RNG-RSP message, and the IUC may be set to 3.

Accordingly, the unicast ranging interval may be used only by the CM 42 that received the RNG-RSP message.

Also, the CM 42 according to an embodiment of the present invention sends a RNG-REQ message during the unicast ranging interval allocated thereto at step S413.

Also, the CMTS 41 according to an embodiment of the present invention allocates an interval for additional ranging at step S415.

When initial ranging is completed, a Primary SID may be allocated to the corresponding CM 42.

Also, the CMTS 41 according to an embodiment of the present invention sends a RNG-RSP message including time adjustment information, which is set with reference to the time at which the ranging message of the CM 42 is received, to the CM 42 at step S417.

Also, the CM 42 according to an embodiment of the present invention adjusts time information at step S419 upon receiving the RNG-RSP message.

The above-described steps S401 to S419 are repeated until the time information synchronized between the CMTS 41 and the CM 42 is within an acceptable range.

Figure 5:
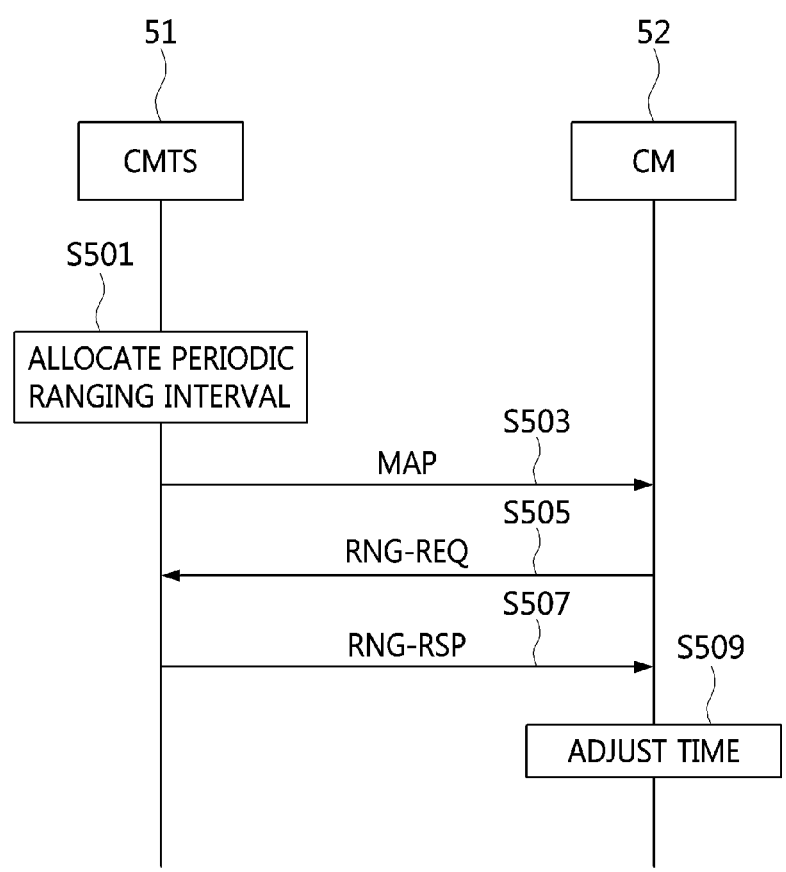
FIG. 5 is a view that shows a periodic ranging procedure based on DOCSIS between a CMTS and a CM according to an embodiment of the present invention.

FIG. 5 is a view that shows a periodic ranging procedure based on DOCSIS between a cable modem termination system and a cable modem according to an embodiment of the present invention.

A Cable Modem Termination System (CMTS) and a cable modem (CM) according to an embodiment of the present invention periodically perform ranging at preset intervals after initial ranging in order to maintain time synchronization.

For example, periodic ranging may be performed every 2 to 10 seconds.

Referring to FIG. 5, the CMTS 51 according to an embodiment of the present invention allocates periodic ranging intervals for respective CMs 52 at preset intervals at step S501.

Here, the CMTS 51 may allocate unicast ranging intervals for periodic ranging, set the SID to the Primary SID that was assigned to the CM 52 when initial ranging was completed, and set the IUC to 4.

Also, the CMTS 51 according to an embodiment of the present invention sends a MAP to the CM 52 at step S503.

Also, the CM 52 according to an embodiment of the present invention sends a RNG-REQ message to the CMTS 51 during the unicast ranging interval allocated thereto at step S505.

Also, the CMTS 51 according to an embodiment of the present invention sends a RNG-RSP message including time adjustment information, which is set with reference to the time at which the ranging message of the CM 52 is received, to the CM 52 at step S507.

Also, the CM 52 according to an embodiment of the present invention receives the RNG-RSP message and adjusts time information at step S509.

Accordingly, periodic ranging is repeatedly performed by performing the above-described steps S501 to S509 at preset intervals, whereby time synchronization between the CMTS and the CM may be maintained.

Figure 6:
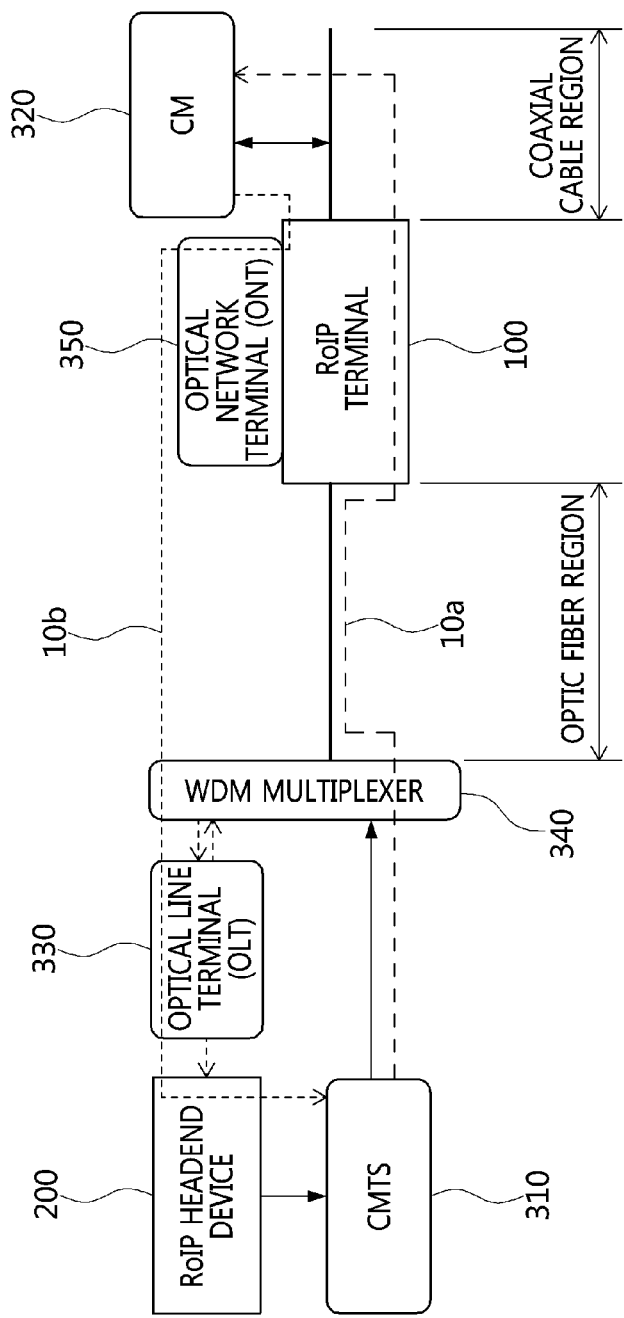
FIG. 6 is a view that shows a synchronization system for transmitting a DOCSIS upstream signal over an optical IP network according to an embodiment of the present invention.

FIG. 6 is a view that shows a synchronization system for transmitting a DOCSIS upstream signal over an optical IP network according to an embodiment of the present invention.

Specifically, FIG. 6 shows synchronization using a DOCSIS-based protocol, which is used in a cable broadcast, and transmission of an upstream signal using an optical IP network (EPON, GPON, or the like).

Referring to FIG. 6, the synchronization system 1 for transmitting a DOCSIS upstream signal over an optical IP network according to an embodiment of the present invention includes a Cable Modem Termination System (CMTS) 310, an RoIP headend device 200, an Optical Line Terminal (OLT) 330, a Wavelength Division Multiplexing (WDM) device 340, an RoIP terminal 100, an Optical Network Terminal (ONT) 350, a Cable Modem (CM) 320, and the like.

Here, the synchronization system 1 for transmitting a DOCSIS upstream signal over an optical IP network may include a set-top box (STB) rather than the CM 320, or may include both the CM 320 and the STB.

In the synchronization system 1 for transmitting a DOCSIS upstream signal over an optical IP network according to an embodiment of the present invention, a downstream signal is delivered from the CMTS 310 to the CM 320 in such a way that the downstream RF signal output from the CMTS 310 is converted into an optical signal of the broadcast wavelength in the WDM device 340 and is then transmitted to the subscriber's side via optical fiber (10*a*).

Here, the RoIP terminal 100 located at the endpoint of the optical fiber separates the transmitted downstream signal of the broadcast wavelength and converts the same into an electric signal so as to be output via a cable set-top box or the CM 320.

In the synchronization system 1 for transmitting a DOCSIS upstream signal over an optical IP network according to an embodiment of the present invention, an upstream RF signal generated in the CM 320 is converted into a digital signal in the RoIP terminal 100 and is transmitted to the headend in the form of an IP packet over an optical network. That is, the signal in the form of an IP packet is transmitted from the ONT 350 on the subscriber's side to the OLT 330 on the service provider's side. Then, the signal in the form of an IP packet is converted back into the upstream RF signal in the RoIP headend device 200 and is then input to the CMTS 310 as the upstream signal (10*b*).

Here, the ONT 350 may be implemented as a single function block of the RoIP terminal 100, or may be implemented as a separate device.

Here, packets transmitted via the IP network may have a different transmission delay. Accordingly, the RoIP terminal 100 and the RoIP headend device 200 transmit a signal after synchronizing the signal based on the DOCSIS-based TDMA between the CMTS 310 and the CM 320. To this end, the RoIP headend device 200 may perform time synchronization with the CMTS 310, and the RoIP terminal 100 may perform time synchronization with the CM 320.

When the RoIP terminal 100 receives an upstream signal from the CM 320 after synchronization, the RoIP terminal 100 transmits information about the time at which the signal is to be transmitted to the CMTS 310, which is acquired using the interval allocation information within the MAP message, to the RoIP headend device 200 by containing the information in the IP packet, and the RoIP headend device 200 converts the upstream burst data into an RF signal and outputs the RF signal to the CMTS 310 with reference to the transmission time information contained in the IP packet.

Figure 7:
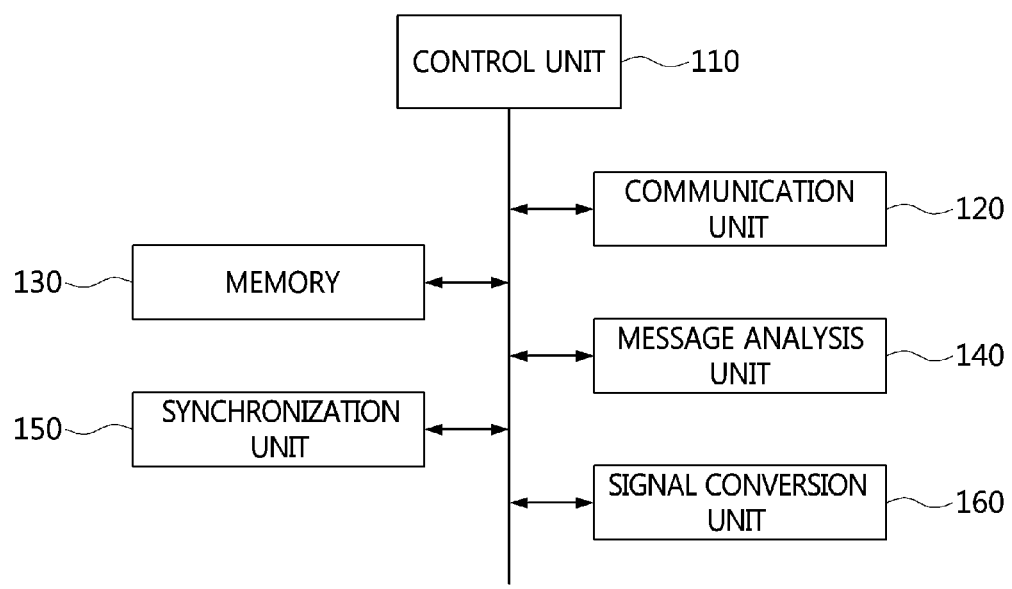
FIG. 7 is a view that shows the configuration of a Radio over IP (RoIP) terminal according to an embodiment of the present invention.

FIG. 7 is a view that shows the configuration of an RoIP terminal according to an embodiment of the present invention.

Referring to FIG. 7, the RoIP terminal 100 according to an embodiment of the present invention includes a control unit 110, a communication unit 120, memory 130, a message analysis unit 140, a synchronization unit 150, a signal conversion unit 160, and the like.

Specifically, the control unit 110 is a kind of central processing unit, and controls the overall configuration of the RoIP terminal 100. That is, the control unit 110 may provide various functions by controlling the communication unit 120, the memory 130, the message analysis unit 140, the synchronization unit 150, the signal conversion unit 160, and the like.

Here, the control unit 110 may include all kinds of devices capable of processing data, such as a processor and the like. Here, a 'processor' may indicate, for example, a data-processing device embedded in hardware, which has a circuit physically structured for performing functions represented as code or instructions included in a program. An example of such a data-processing device embedded in hardware may include processing devices such as a microprocessor, a central processing unit (CPU), a processor core, a multiprocessor, an application-specific integrated circuit (ASIC), a field-programmable gate array (FPGA), and the like, but the present invention is not limited thereto.

The communication unit 120 may receive an RF signal, corresponding to an upstream signal transmitted from the CM (320 in FIG. 6), and transmit an IP packet corresponding to the RF signal to the CMTS (310 in FIG. 6).

Also, the communication unit 120 may receive an optical signal of a broadcast wavelength, corresponding to a downstream signal transmitted from the CMTS (310 in FIG. 6), and transmit an electric signal corresponding to the optical signal to the CM (320 in FIG. 6).

Here, the communication unit 120 may be a device including hardware and software that are necessary in order to transmit and receive signals, such as control signals or data signals, through a wired or wireless connection with another network device.

The memory 130 functions to temporarily or permanently store data processed by the control unit 110. Here, the memory 130 may include magnetic storage media or flash storage media, but the present invention is not limited thereto.

The message analysis unit 140 acquires information by analyzing a received message.

Here, the message analysis unit 140 may acquire clock information and time information from a synchronization message sent from the CMTS (310 in FIG. 6).

Here, the message analysis unit 140 may acquire synchronization time information for time synchronization with the CM (320 in FIG. 6) using a RNG-REQ message sent from the CM (320 in FIG. 6).

Here, the message analysis unit 140 may acquire time adjustment information for adjusting time using a RNG-RSP message sent from the CMTS (310 in FIG. 6).

The synchronization unit 150 synchronizes a clock or time using the analyzed message.

Here, the synchronization unit 150 may synchronize a clock by receiving a synchronization (SYNC) message sent from the CMTS (310 in FIG. 6).

Here, the synchronization unit 150 may synchronize time with the CM (320 in FIG. 6) using a RNG-REQ message sent from the CM (320 in FIG. 6).

Here, the synchronization unit 150 may synchronize time with the CM (320 in FIG. 6) using the difference between the time at which the RNG-REQ message sent from the CM (320 in FIG. 6) is received and the start time of a ranging interval.

Here, the synchronization unit 150 may adjust the time using time adjustment information acquired from the RNG-RSP message sent from the CMTS (310 in FIG. 6).

The signal conversion unit 160 converts an RF signal, corresponding to a signal transmitted from the CM (320 in FIG. 6), into an IP packet in order to transmit the signal to the CMTS (310 in FIG. 6).

Also, the signal conversion unit 160 may convert an optical signal of the broadcast wavelength, corresponding to a downstream signal transmitted from the CMTS (310 in FIG. 6), into an electric signal in order to transmit the signal to the CM (320 in FIG. 6).

Figure 8:
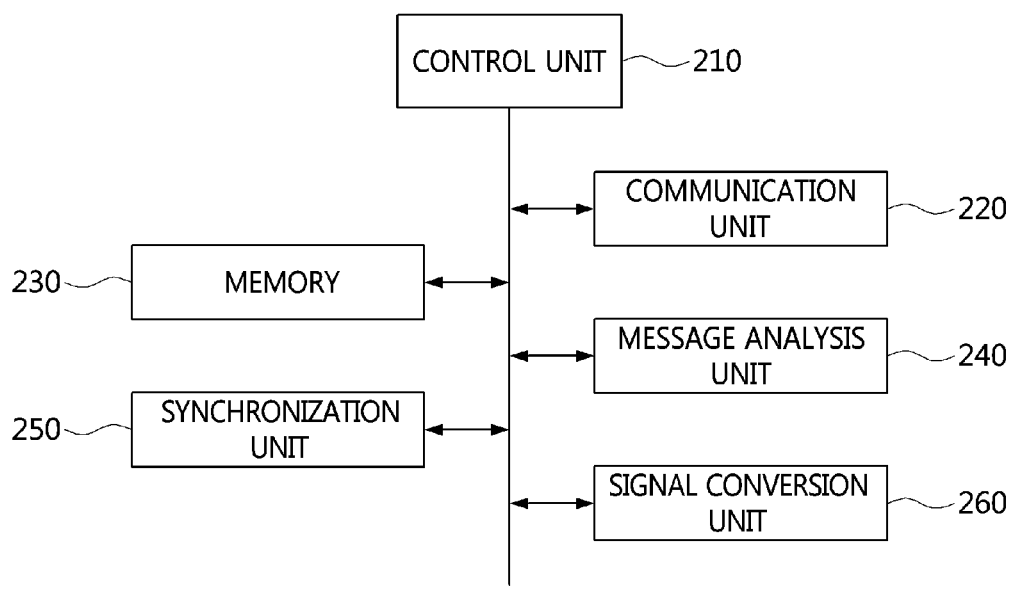
FIG. 8 is a view that shows the configuration of an RoIP headend device according to an embodiment of the present invention.

FIG. 8 is a view that shows the configuration of an RoIP headend device according to an embodiment of the present invention.

Referring to FIG. 8, the RoIP headend device 200 according to an embodiment of the present invention includes a control unit 210, a communication unit 220, memory 230, a message analysis unit 240, a synchronization unit 250, a signal conversion unit 260, and the like.

Specifically, the control unit 210 is a kind of central processing unit and controls the overall configuration of the RoIP headend device 200. That is, the control unit 210 may provide various functions by controlling the communication unit 220, the memory 230, the message analysis unit 240, the synchronization unit 250, the signal conversion unit 260, and the like.

Here, the control unit 210 may include all kinds of devices capable of processing data, such as a processor and the like. Here, a 'processor' may indicate, for example, a data-processing device embedded in hardware, which has a circuit physically structured for performing functions represented as code or instructions included in a program. An example of such a data-processing device embedded in hardware may include processing devices such as a microprocessor, a central processing unit (CPU), a processor core, a multiprocessor, an application-specific integrated circuit (ASIC), a field-programmable gate array (FPGA), and the like, but the present invention is not limited thereto.

The communication unit 220 receives an IP packet corresponding to an upstream signal transmitted from the CM (320 in FIG. 6) and transmits an RF signal corresponding to the IP packet to the CMTS (310 in FIG. 6).

Here, the communication unit 220 may be a device including hardware and software that are necessary in order to transmit and receive signals, such as control signals or data signals, through a wired or wireless connection with another network device.

The memory 230 functions to temporarily or permanently store data processed by the control unit 210. Here, the memory 230 may include magnetic storage media or flash storage media, but the present invention is not limited thereto.

The message analysis unit 240 acquires information by analyzing a received message.

Here, the message analysis unit 240 may acquire clock information and time information from a SYNC message sent from the CMTS (310 in FIG. 6).

The synchronization unit 250 synchronizes a clock or time using the analyzed message.

Here, the synchronization unit 250 may synchronize a clock by receiving the SYNC message sent from the CMTS (310 in FIG. 6).

Here, the synchronization unit 250 may synchronize time with the CMTS (310 in FIG. 6) through ranging.

The signal conversion unit 260 converts an IP packet, corresponding to a signal transmitted from the CM (320 in FIG. 6), into an RF signal in order to transmit the signal to the CMTS (310 in FIG. 6).

Figure 9:
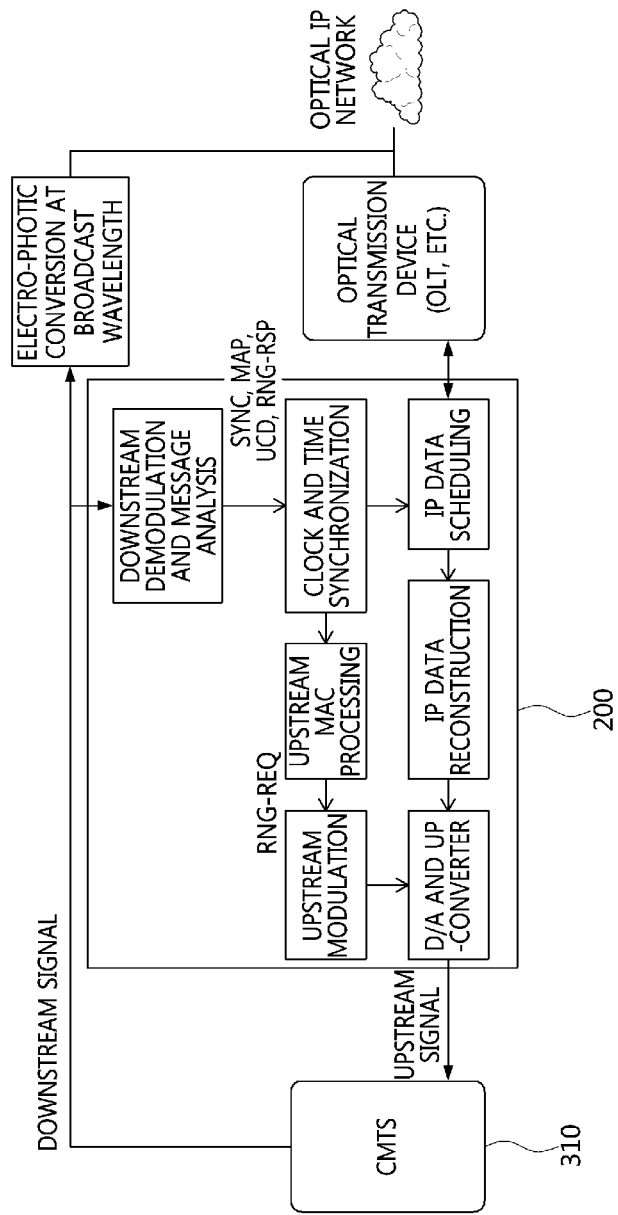
FIG. 9 is a view that shows a synchronization process in an RoIP headend device according to an embodiment of the present invention.

FIG. 9 is a view that shows a synchronization process in an RoIP headend device 200 according to an embodiment of the present invention.

The synchronization method in the RoIP headend device 200 on the service provider's side is the same as the method of synchronization between the CMTS 310 and the CM (320 in FIG. 6). That is, synchronization is performed whereby the RoIP headend device 210 operates as an arbitrary CM (320 in FIG. 6).

Clock synchronization is performed using a SYNC message sent by the CMTS 310, and time synchronization with the CMTS 310 is performed through initial ranging and periodic ranging with the CMTS 310.

Also, the RoIP headend device 200 converts a burst into an RF signal and transmits the RF signal to the CMTS 310 when the time at which the burst is to be transmitted, which is set by the RoIP terminal (100 in FIG. 6) using the synchronized time information, matches the start time of an allocated interval, which is set in a MAP message sent by the CMTS 310.

Figure 10:
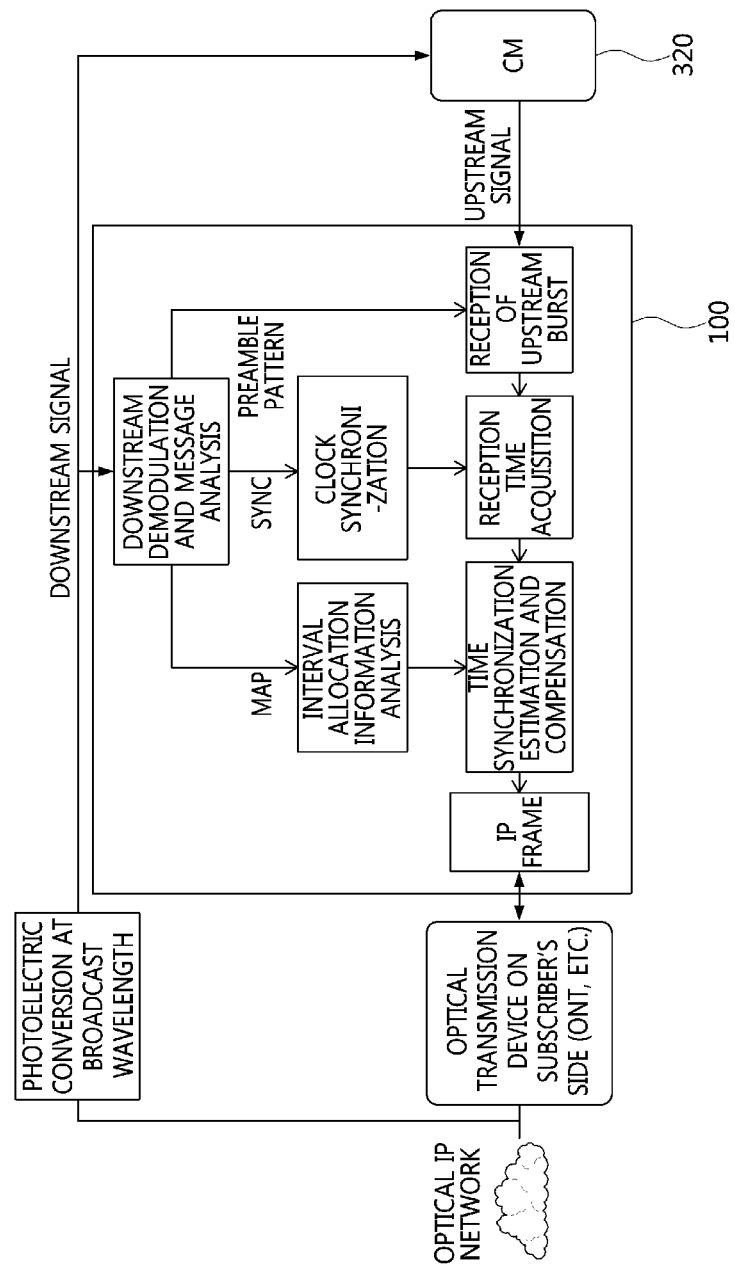
FIG. 10 is a view that shows a synchronization process in an RoIP terminal according to an embodiment of the present invention.

FIG. 10 is a view that shows a synchronization process in an RoIP terminal according to an embodiment of the present invention.

The CM 320 synchronizes a clock using a SYNC message sent as downstream data from the CMTS (310 in FIG. 6) in the initialization process and synchronizes time through initial ranging with the CMTS (310 in FIG. 6).

Like the CM 320, the RoIP terminal 100 synchronizes a clock using a SYNC message sent as downstream data from the CMTS (310 in FIG. 6), and thereby internally generates a interval allocation time.

The SYNC message first received by the CM 320 is delayed for an amount of time equal to a downstream transmission delay from the CMTS (310 in FIG. 6) due to a physical transmission delay or the like. Accordingly, the CMTS (310 in FIG. 6) may allocate an initial ranging interval that is sufficiently long in consideration of the transmission delay.

Here, information about the initial ranging interval may be transmitted in advance from the CMTS (310 in FIG. 6) using a MAP message.

The CM 320 first transmits a burst in the corresponding interval, and the RoIP terminal 100 receives the burst transmitted by the CM 320, creates an IP packet therefrom, and transmits the IP packet to the RoIP headend device (200 in FIG. 6) on the service provider's side.

Here, the RoIP terminal 100 separately sets the time T3 at which the burst is received and the time T2 at which the corresponding burst must be transmitted to the CMTS, which is defined in the MAP message, in the IP packet. Then, the RoIP headend device (200 in FIG. 6) converts the IP packet into an RF signal and transmits the RF signal to the CMTS (310 in FIG. 6) with reference to the time T2 at which the burst must be transmitted, which is contained in the IP packet.

Here, the RoIP terminal 100 adjusts the internal time and the time at which the burst, received from the CM 320, is to be transmitted.

In the case of an initial RNG-REQ message using a broadcast ranging interval, after it receives the initial RNG-REQ message, the RoIP terminal 100 adjusts time information generated therein using the difference between the time at which the RNG-REQ message is actually received and the start time of the allocated initial ranging interval.

Here, the CMTS (310 in FIG. 6) transmits time adjustment information in the form of a RNG-RSP message to the CM 320 as a downstream signal, and the RoIP terminal 100 may adjust the internally generated time information using the time synchronization information in the RNG-RSP message.

Then, in the case of an initial RNG-REQ message using a unicast ranging interval, when additional time synchronization is necessary, the CMTS (310 in FIG. 6) allocates a unicast ranging interval to the CM 320.

Here, when it receives the initial RNG-REQ message sent from the CM 320, the RoIP terminal 100 may transmit, to the RoIP headend device (200 in FIG. 6), an IP packet in which the time at which the message is actually received is set as the time at which the corresponding burst must be transmitted from the RoIP headend device (200 in FIG. 6). Also, the RoIP terminal 100 may adjust the internally generated time information using time synchronization information of a RNG-RSP message.

Also, in the case of a periodic RNG-REQ message, the CMTS (310 in FIG. 6) periodically allocates unicast ranging intervals to respective CMs 320 in order to continuously maintain synchronization with the CMs 320 after synchronization is completed.

Also, when it receives a unicast periodic RNG-REQ message sent from the CM 320, the RoIP terminal 100 may transmit, to the RoIP headend device (200 in FIG. 6), an IP packet in which the time at which the message is actually received is set as the time at which the corresponding burst must be transmitted from the RoIP headend device (200 in FIG. 6). Also, the RoIP terminal 100 may adjust the internally generated time information using time synchronization information of a RNG-RSP message.

Also, in the case of other upstream messages, when it receives an upstream signal from the CM 320, the RoIP terminal 100 may select an interval, the start time of which is closest to the time at which the upstream signal is received, from among intervals in the MAP message, and transmit, to the RoIP headend device (200 in FIG. 6), an IP packet in which the start time of the selected interval is set as the time at which the corresponding burst must be transmitted from the RoIP headend device 200.

Figure 11:
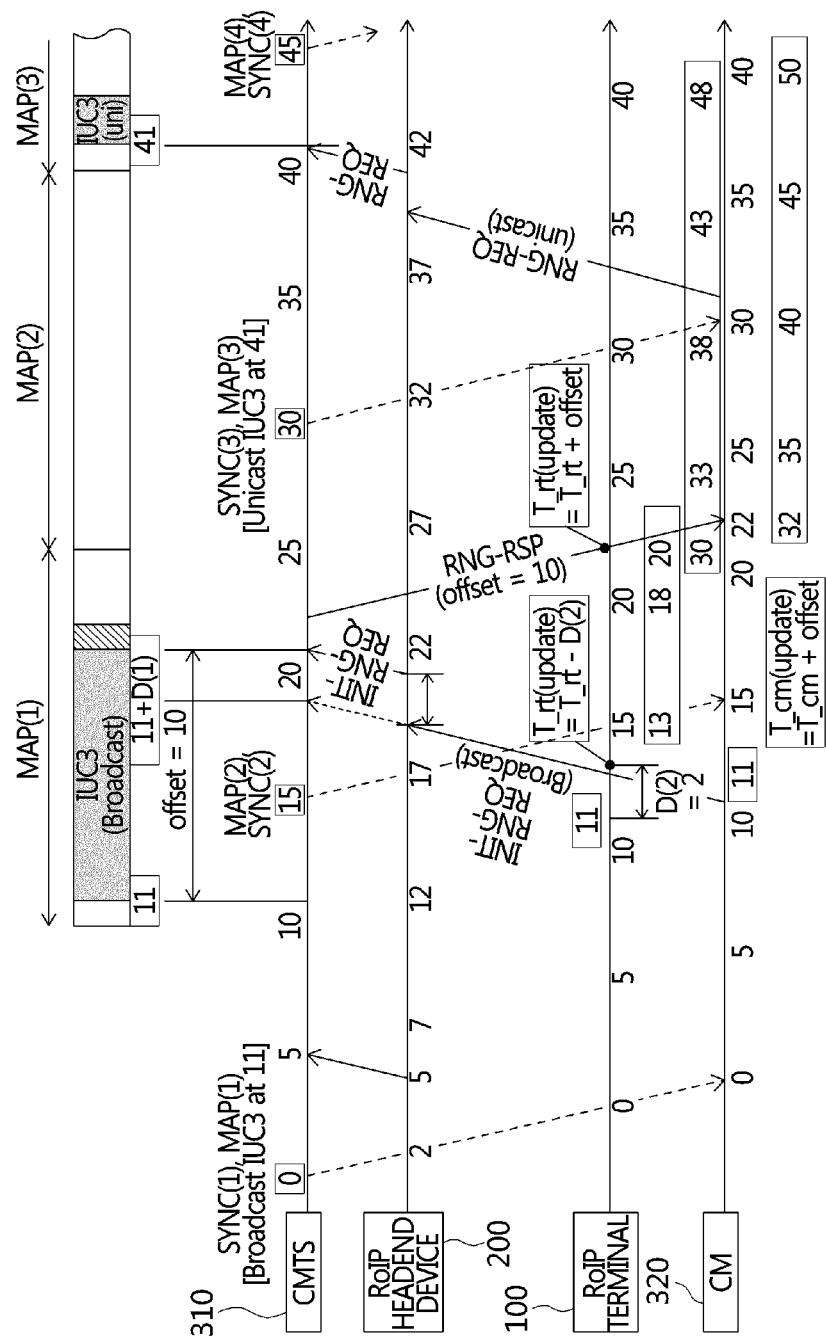
FIG. 11 is a view that shows an example of an RoIP network synchronization process according to an embodiment of the present invention.

FIG. 11 is a view that shows an example of an RoIP network synchronization process according to an embodiment of the present invention.

Packets transmitted via an IP network have varying transmission delay. Accordingly, the RoIP headend device 200 and the RoIP terminal 100 are required to transmit signals synchronized based on the DOCSIS-based TDMA between the CMTS 310 and the CM 320.

The RoIP headend device 200 synchronizes time with the CMTS 310 similarly to synchronization of the CM 320. That is, a reference clock is reconstructed, and a local time is generated using a SYNC message sent downstream, and the local time is synchronized with the reference time of the CMTS 310 through the DOCSIS ranging mechanism.

Specifically, the RoIP headend device 200, the RoIP terminal 100, and the CM 320 receive a SYNC message sent by the CMTS 310, synchronize with a reference clock depending on the SYNC message, and generate a reference time and adjust the same.

However, at the outset, the RoIP headend device 200, the RoIP terminal 100, and the CM 320 have different reference times due to varying transmission delay.

Here, the CM 320 performs ranging for time synchronization with the CMTS 310. That is, the CM 320 sends an INIT-RNG-REQ message during the initial ranging interval (SID: 0x3FFF, IUC=3) set in a MAP message sent from the CMTS 310.

The RoIP terminal 100 receives the INIT-RNG-REQ message sent by the CM 320. The RoIP terminal 100 may synchronize its reference time with the reference time of the CM 320 by adjusting the difference between the time at which the INIT-RNG-REQ message is received and the start time of the initial ranging interval (SID: 0x3FFF, IUC=3) set in the MAP message.

Then, the RoIP terminal 100 converts the received initial ranging signal (INIT-RNG-REQ message) into a digital signal and transmits the digital signal to the RoIP headend device 200 over an IP network. Here, the start time of the initial ranging interval (SID: 0x3FFF, IUC=3) may be transmitted along with the signal.

The RoIP headend device 200, which is already synchronized with the CMTS 310 through the DOCSIS initialization process, may convert the signal transmitted via the IP network into an analog RF signal and output the RF signal using the interval allocation information included in the MAP message.

Here, the INIT-RNG-REQ message may be transmitted in the last Transmission Opportunity (TO) of the initial ranging interval (SID: 0x3FFF, IUC=3). That is, the INIT-RNG-REQ signal may be transmitted such that the end time thereof matches the end time of the initial ranging interval.

The CMTS 310, having received the INIT-RNG-REQ message, transmits time adjustment information for the CM 320 using a RNG-RSP message.

Here, the RoIP terminal 100 and the CM 320 may adjust the internal time by interpreting the RNG-RSP message sent from the CMTS 310 to the CM 320.

Figure 12:
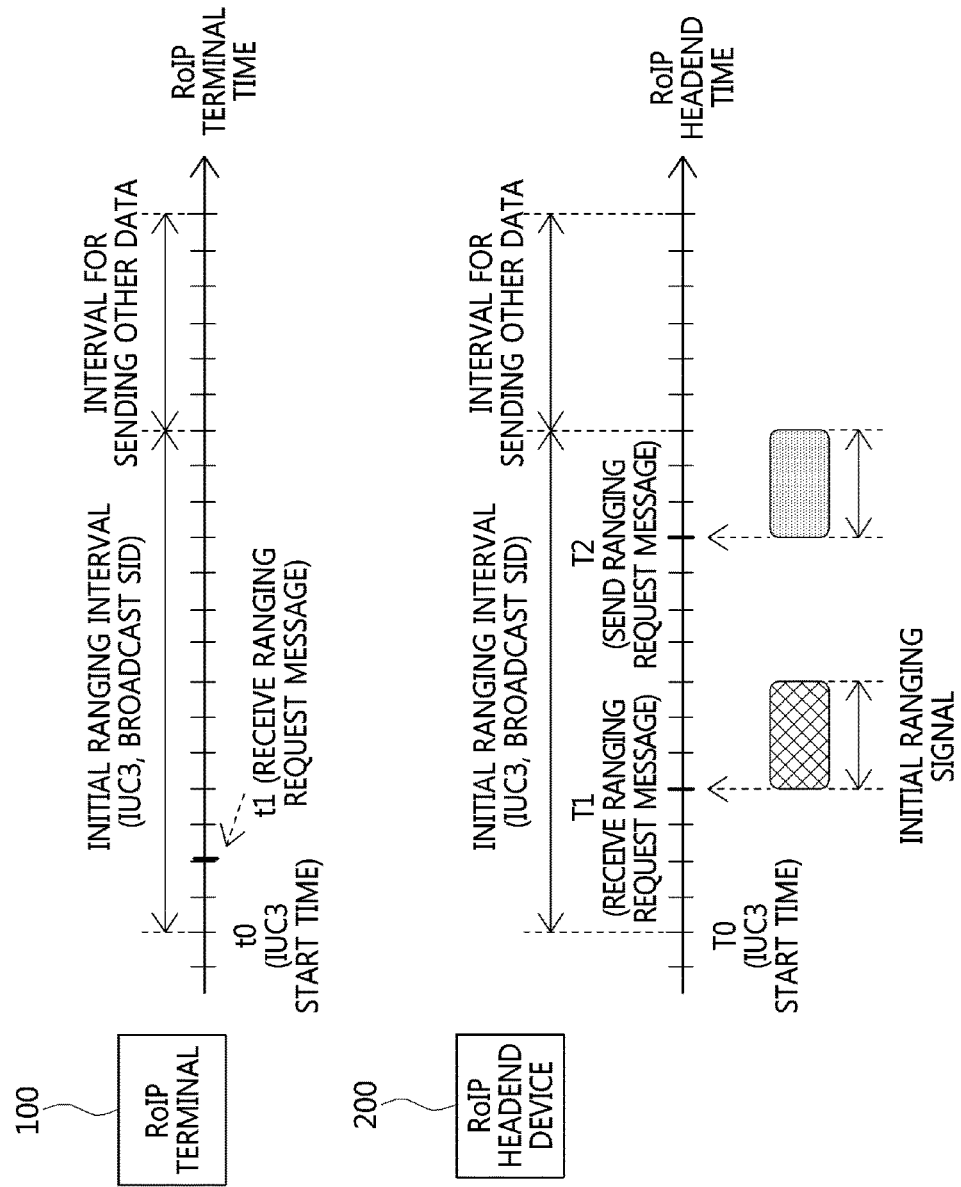
FIG. 12 shows an example in which an RoIP network synchronization algorithm is run during initial ranging according to an embodiment of the present invention.

FIG. 12 shows an example in which an RoIP network synchronization algorithm is run during initial ranging according to an embodiment of the present invention.

Referring to FIG. 12, the RoIP terminal 100 receives a RNG-REQ message that is sent by the CM (320 in FIG. 6) at t0, which is the start time of an initial ranging interval. Here, t0 corresponds to t1 based on the time of the RoIP terminal 100.

That is, the difference between t1 and t0 may indicate the time difference that is actually measured between the RoIP terminal 100 and the CM (320 in FIG. 6).

Accordingly, the RoIP terminal 100 adjusts a time offset using (t140) and sends the time information t0 to the RoIP headend device 200.

The RoIP headend device 200 receives the RNG-REQ message that is sent by the CM (320 in FIG. 6) at T0, which is the start time of the initial ranging interval. Here, T0 corresponds to T1 based on the time of the RoIP headend device 200.

That is, the difference between T1 and T0 may indicate the time difference that is actually measured between the RoIP headend device 200 and the CM (320 in FIG. 6).

Then, the RoIP headend device 200 sends the RNG-REQ message at T2 by delaying transmission such that the time at which the RNG-REQ message is received matches the end time of the initial ranging interval.

That is, the difference between T2 and T0 may indicate a time difference between the RoIP headend device 200 and the CM 320 after the IP network transmission delay is compensated for. Here, the time difference, (T2−T0), may be compensated for using a RNG-RSP message.

Figure 13:
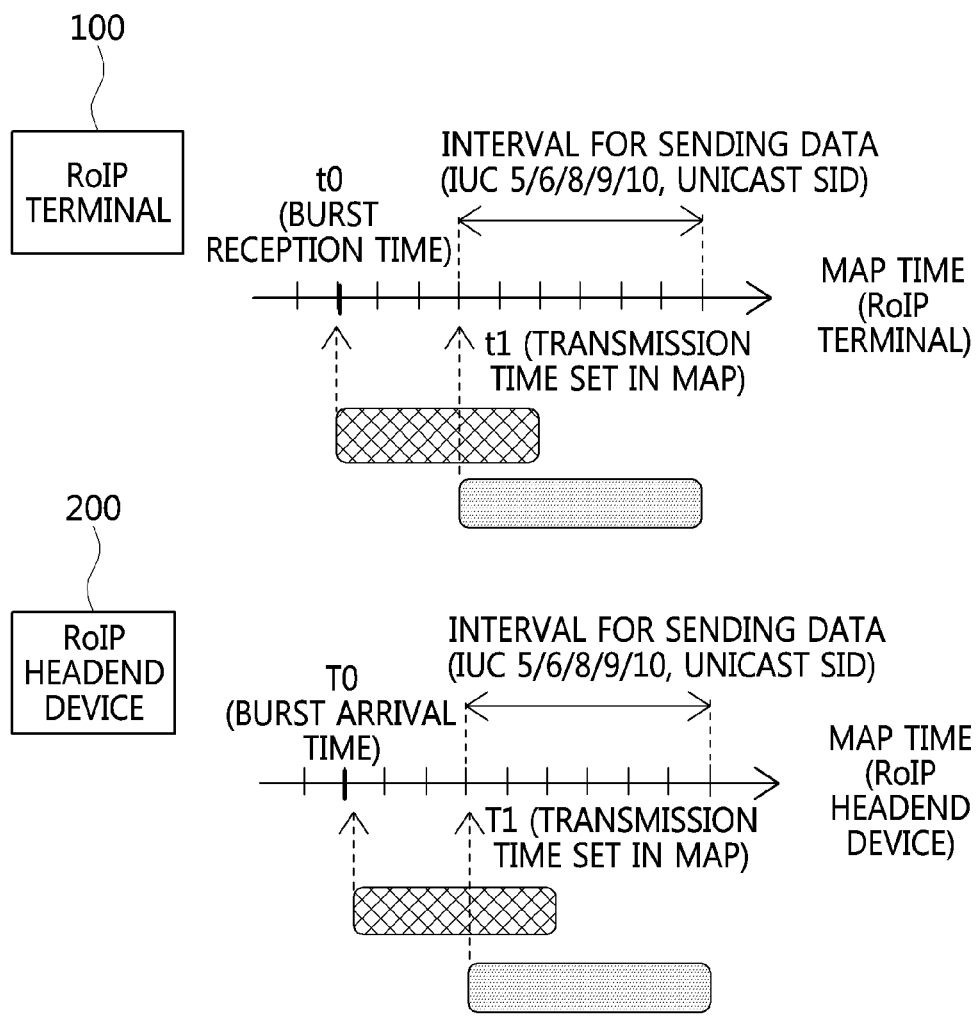
FIG. 13 shows an example in which an RoIP network synchronization algorithm is run after initial ranging according to an embodiment of the present invention.

FIG. 13 shows an example in which an RoIP network synchronization algorithm is run after initial ranging according to an embodiment of the present invention.

Referring to FIG. 13, after initial ranging, when the RoIP terminal 100 receives a signal transmitted from the CM 320 at t0, the RoIP terminal 100 searches a MAP message for an allocated interval during which the received signal is to be transmitted, converts the received signal including time information t1, which is the start time of the allocated interval, into a digital signal, and transmits the signal to the RoIP headend device 200 over an IP network.

Then, the RoIP headend device 200 converts the data transmitted over the IP network into an analog signal and transmits the analog signal to the CMTS 310 at the start time of the allocated interval with reference to the MAP message.

Figure 14:
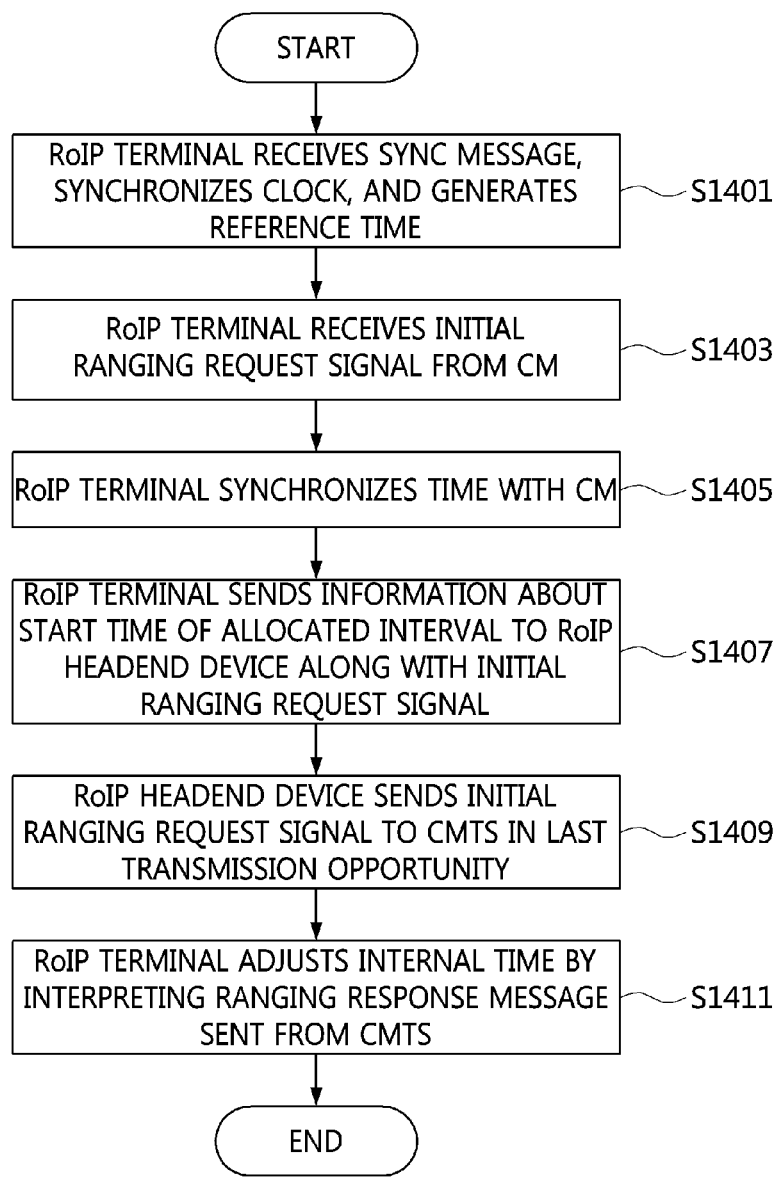
FIG. 14 is a flowchart that shows a synchronization method for transmitting a DOCSIS upstream signal over an optical IP network according to an embodiment of the present invention.

FIG. 14 is a flowchart that shows a synchronization method for transmitting a DOCSIS upstream signal over an optical IP network according to an embodiment of the present invention.

Referring to FIG. 14, in the synchronization method for transmitting a DOCSIS upstream signal over an optical IP network according to an embodiment of the present invention, the RoIP terminal (100 in FIG. 6) synchronizes a clock and generates a reference time at step S1401 by receiving a synchronization (SYNC) message periodically sent from the CMTS (310 in FIG. 6).

Also, in the synchronization method for transmitting a DOCSIS upstream signal over an optical IP network according to an embodiment of the present invention, the RoIP terminal (100 in FIG. 6) receives an initial ranging request (RNG-REQ) message from the CM (320 in FIG. 6) at step S1403.

Also, in the synchronization method for transmitting a DOCSIS upstream signal over an optical IP network according to an embodiment of the present invention, the RoIP terminal (100 in FIG. 6) calculates a difference between the time at which the RoIP terminal (100 in FIG. 6) received the initial RNG-REQ signal from the CM (320 in FIG. 6) and the start time of an initial ranging interval set in a MAP message and adjusts the time as the difference, thereby synchronizing time with the CM (320 in FIG. 6) at step S1405.

Also, in the synchronization method for transmitting a DOCSIS upstream signal over an optical IP network according to an embodiment of the present invention, the RoIP terminal (100 in FIG. 6) converts information about the start time of an allocated interval into an IP packet along with the initial RNG-REQ signal, and sends the IP packet to the RoIP headend device (200 in FIG. 6) at step S1407.

Also, in the synchronization method for transmitting a DOCSIS upstream signal over an optical IP network according to an embodiment of the present invention, the RoIP headend device (200 in FIG. 6) converts the initial RNG-REQ signal into an RF signal and transmits the RF signal to the CMTS (310 in FIG. 6) in the last transmission opportunity, at which the end time of the initial RNG-REQ signal matches the end time of the initial ranging interval, at step S1409.

Also, in the synchronization method for transmitting a DOCSIS upstream signal over an optical IP network according to an embodiment of the present invention, the RoIP terminal (100 in FIG. 6) adjusts its internal time at step S1411 by interpreting a ranging response (RNG-RSP) message sent from the CMTS (310 in FIG. 6).

Accordingly, synchronization for transmitting a DOCSIS upstream signal over an optical IP network is performed, whereby an upstream signal may be transmitted over an IP network without changing the DOCSIS-based cable transmission system. Also, because existing cable network transmission devices may be used even in the event of integration of a cable broadcast network or an internal broadcast network with a passive optical network, which is anticipated in the future, the investment efficiency of a service provider may be improved.

According to the present invention, through a synchronization apparatus and method for transmitting a DOCSIS upstream signal over an optical IP network, a DOCSIS-based upstream signal used in a cable broadcast is transmitted over an optical IP network by being synchronized with a DOCSIS network, whereby the upstream signal may be transmitted over the IP network without changing a DOCSIS-based cable transmission system. Also, because existing cable network transmission devices may be used even in the event of integration of a cable broadcast network or an internal broadcast network with a passive optical network, which is anticipated in the future, the investment efficiency of a service provider may be improved.

Although specific embodiments have been described in the specification, they do not limit the scope of the present invention. For the conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, corresponding components may not be absolutely necessary.

Accordingly, the spirit of the present invention should not be construed as being limited to the above-described embodiments, and the entire scope of the appended claims and their equivalents will fall within the scope and spirit of the present invention.

What is claimed is:

1. A synchronization method for transmitting a Data Over Cable Service Interface Specification (DOCSIS) upstream signal, which is performed by a Radio over Internet Protocol (RoIP) terminal, comprising:

receiving a synchronization (SYNC) message periodically sent from a Cable Modem Termination System (CMTS), and thereby synchronizing a clock and generating a reference time;

receiving a ranging request signal, which is a Radio Frequency (RF) signal, from a Cable Modem (CM);

converting the ranging request signal, including information about a time at which the ranging request signal is received and information about a start time of an allocated ranging interval, into an Internet Protocol (IP) packet; and transmitting the IP packet to an RoIP headend device over an IP network in order to enable the RoIP headend device to convert the IP packet into an RF signal and to transmit the RF signal to the CMTS, wherein the RoIP terminal performs a clock synchronization with the CM, and wherein the RoIP headend device performs a clock synchronization with the CMTS.

2. The synchronization method of claim 1, further comprising:

synchronizing time with the CM using the ranging request signal.

3. The synchronization method of claim 2, wherein synchronizing time with the CM is configured to synchronize time using a difference between the time at which the ranging request signal is received and the start time of the allocated ranging interval.

4. The synchronization method of claim 3, further comprising:
receiving a ranging response message corresponding to the ranging request signal delivered from the CMTS;
adjusting time by interpreting the ranging response message; and
converting the ranging response message into an electric signal and transmitting the electric signal to the CM.

5. The synchronization method of claim 4, wherein:
converting the ranging request signal into an IP packet is configured to convert both the information about the start time of the allocated ranging interval and the ranging request signal into an initial ranging IP packet when the ranging request signal is an initial ranging request signal;
transmitting the IP packet to the RoIP headend device is configured to transmit the initial ranging IP packet to the RoIP headend device over the IP network; and
the RoIP headend device is configured to convert the initial ranging IP packet into an RF signal and to transmit the RF signal to the CMTS in a last transmission opportunity when the ranging request signal is an initial ranging request signal.

6. The synchronization method of claim 5, wherein the last transmission opportunity corresponds to a transmission time that makes an end time of the ranging request signal at the CMTS match an end time of the allocated ranging interval when the RoIP headend device transmits the ranging request signal to the CMTS.

7. The synchronization method of claim 6, wherein converting the ranging request signal into an IP packet is configured to convert the ranging request signal, with setting a time at which the RoIP headend device is to transmit an IP packet to the CMTS to a time at which the ranging request signal is received, into an IP packet when the ranging request signal is not an initial ranging request signal.

8. A synchronization apparatus for transmitting a Data Over Cable Service Interface Specification (DOCSIS) upstream signal, comprising:
a communication unit for communicating with a Cable Modem Termination System (CMTS), a Radio over Internet Protocol (RoIP) headend device, and a Cable Modem (CM);
a synchronization unit for synchronizing a clock and generating a reference time by receiving a synchronization (SYNC) message periodically sent from the CMTS; and
a signal conversion unit for converting a ranging request signal, which is delivered from the CM and is a Radio Frequency (RF) signal, including information about a time at which the ranging request signal is received and information about a start time of an allocated ranging interval, into an Internet Protocol (IP) packet in order to transmit the ranging request signal to the RoIP headend device,
wherein the synchronization unit performs a clock synchronization with the CM, and
wherein the RoIP headend device performs a clock synchronization with the CMTS.

9. The synchronization apparatus of claim 8, wherein the synchronization unit synchronizes time using a difference between the time at which the ranging request signal is received and the start time of the allocated ranging interval.

10. The synchronization apparatus of claim 9, wherein:
the synchronization unit adjusts time by interpreting a ranging response message, corresponding to the ranging request signal, received from the CMTS; and
the signal conversion unit converts the ranging response message into an electric signal in order to send to the CM.

11. The synchronization apparatus of claim 10, wherein:
the signal conversion unit converts both the information about the start time of the allocated ranging interval and the ranging request signal into an initial ranging IP packet when the ranging request signal is an initial ranging request signal; and
the communication unit transmits the initial ranging IP packet to the RoIP headend device over the IP network; and
the RoIP headend device converts the initial ranging IP packet into an RF signal and transmits the RF signal to the CMTS in a last transmission opportunity when the ranging request signal is the initial ranging request signal.

12. The synchronization apparatus of claim 11, wherein the last transmission opportunity corresponds to a transmission time that makes an end time of the ranging request signal at the CMTS match an end time of the allocated ranging interval when the RoIP headend device transmits the ranging request signal to the CMTS.

13. The synchronization apparatus of claim 12, wherein the signal conversion unit converts the ranging request signal, with setting a time at which the RoIP headend device is to transmit an IP packet to the CMTS to a time at which the ranging request signal is received, into the IP packet when the ranging request signal is not an initial ranging request signal.

14. A synchronization method for transmitting a Data Over Cable Service Interface Specification (DOCSIS) upstream signal, which is performed by a Radio over Internet Protocol (RoIP) headend device, comprising:
receiving a synchronization (SYNC) message periodically sent from a Cable Modem Termination System (CMTS) and thereby synchronizing a clock and generating a reference time;
receiving a ranging request signal, which is an Internet Protocol (IP) packet including information about a start time of an allocated ranging interval, from an RoIP terminal over an IP network, the ranging request signal being transmitted from a Cable Modem (CM);
converting the ranging request signal into a Radio Frequency (RF) signal; and
transmitting the RF signal to the CMTS,
wherein the RoIP terminal performs a clock synchronization with the CM, and
wherein the RoIP headend device performs a clock synchronization with the CMTS.

15. The synchronization method of claim 14, further comprising:
synchronizing time with the CMTS through ranging.

16. The synchronization method of claim 15, wherein receiving the ranging request signal is configured to receive the ranging request signal from the RoIP terminal, a time of which is synchronized with the CM using the ranging request signal.

17. The synchronization method of claim 16, wherein receiving the ranging request signal is configured to receive the ranging request signal from the RoIP terminal, the time of which is synchronized with the CM using a difference between a time at which the ranging request signal is received and the start time of the allocated ranging interval.

18. The synchronization method of claim 17, wherein transmitting the RF signal to the CMTS is configured to transmit the RF signal to the CMTS in a last transmission opportunity using the information about the start time of the allocated ranging interval included in the ranging request signal when the ranging request signal is an initial ranging request signal.

19. The synchronization method of claim 18, wherein the last transmission opportunity corresponds to a transmission time that makes an end time of the ranging request signal at the CMTS match an end time of the allocated ranging interval when the ranging request signal is transmitted to the CMTS.

20. The synchronization method of claim 19, wherein:
    transmitting the RF signal to the CMTS is configured to transmit the RF signal to the CMTS at a transmission time set in the ranging request signal by the RoIP terminal when the ranging request signal is not an initial ranging request signal; and
    the transmission time set in the ranging request signal is a time at which the ranging request signal is received.

\* \* \* \* \*